(12) United States Patent
Suzuki et al.

(10) Patent No.: US 8,932,166 B2
(45) Date of Patent: Jan. 13, 2015

(54) DRIVE DEVICE FOR ELECTRIC VEHICLE

(75) Inventors: Minoru Suzuki, Iwata (JP); Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/004,016

(22) PCT Filed: Mar. 8, 2011

(86) PCT No.: PCT/JP2011/055395
§ 371 (c)(1), (2), (4) Date: Sep. 9, 2013

(87) PCT Pub. No.: WO2012/120647
PCT Pub. Date: Sep. 13, 2012

(65) Prior Publication Data
US 2014/0031160 A1    Jan. 30, 2014

(30) Foreign Application Priority Data

Mar. 7, 2011 (JP) ................................ 2011-049187

(51) Int. Cl.
*F16H 3/72* (2006.01)
*B60K 1/00* (2006.01)
(Continued)

(52) U.S. Cl.
CPC .......... *B60K 1/00* (2013.01); *H02K 7/116* (2013.01); *H02K 24/00* (2013.01); *B60K 7/0007* (2013.01);
(Continued)

(58) Field of Classification Search
USPC ........... 475/5, 159, 160, 331, 337; 180/65.51, 180/65.6, 372; 74/606 R, 504, 551
See application file for complete search history.

(56) References Cited

U.S. PATENT DOCUMENTS 5,382,854 A * 1/1995 Kawamoto et al. ......... 310/67 R
5,691,584 A * 11/1997 Toida et al. ................. 310/67 R
(Continued)

FOREIGN PATENT DOCUMENTS

EP    1 932 706 A2    6/2008
JP    2001-32888       2/2001
(Continued)

OTHER PUBLICATIONS

International Preliminary Report on Patentability and Written Opinion of the International Searching Authority issued Sep. 19, 2013 in International (PCT) Application No. PCT/JP2011/055395.
(Continued)

*Primary Examiner* — Michael Mansen
*Assistant Examiner* — Tinh Dang
(74) *Attorney, Agent, or Firm* — Wenderoth, Lind & Ponack, L.L.P.

(57) ABSTRACT

An object of the present invention is to achieve improvements in the rotational accuracy of the input shaft and the durability of the bearings, and suppression of rotational noise, by improving the support structure of the input shaft of the speed reduction unit. Provided is a drive device for an electric vehicle, including: an electric motor; a speed reduction unit including an input shaft driven by output of the electric motor; and a hub unit rotationally driven by an output member of the speed reduction unit, wherein the input shaft of the speed reduction unit is supported by bearings provided at two locations in an axial direction, the drive device for an electric vehicle being configured such that the bearings at the two locations are attached together to the output member.

4 Claims, 9 Drawing Sheets

(51) Int. Cl.
  *H02K 7/116* (2006.01)
  *H02K 24/00* (2006.01)
  *B60K 7/00* (2006.01)
  *B60K 17/04* (2006.01)
  *F16H 57/00* (2012.01)
  *F16H 57/08* (2006.01)

(52) U.S. Cl.
  CPC .......... *B60K 17/046* (2013.01); *F16H 57/0037* (2013.01); *F16H 57/082* (2013.01); *Y02T 10/641* (2013.01); *B60K 2007/0038* (2013.01); *B60K 2007/0092* (2013.01)
  USPC ............. 475/5; 475/331; 180/337; 180/65.51

(56) References Cited

U.S. PATENT DOCUMENTS

| | | | |
|---|---|---|---|
| 7,530,416 B2 * | 5/2009 | Suzuki | 180/65.51 |
| 8,186,467 B2 * | 5/2012 | Yoshino et al. | 180/65.51 |
| 2008/0169141 A1 | 7/2008 | Suzuki | |
| 2009/0166112 A1 * | 7/2009 | Yoshino et al. | 180/65.51 |
| 2010/0187954 A1 | 7/2010 | Kendall et al. | |
| 2010/0236848 A1 | 9/2010 | Loeber | |
| 2010/0326748 A1 | 12/2010 | Sgherri et al. | |
| 2011/0306462 A1 | 12/2011 | Loeber | |
| 2012/0025593 A1 | 2/2012 | Sgherri et al. | |
| 2012/0025594 A1 | 2/2012 | Sgherri et al. | |
| 2014/0024487 A1 * | 1/2014 | Tanaka et al. | 475/150 |

FOREIGN PATENT DOCUMENTS

| | | |
|---|---|---|
| JP | 2007-57015 | 3/2007 |
| JP | 2007-78174 | 3/2007 |
| JP | 2008-37355 | 2/2008 |
| JP | 2010-260476 | 11/2010 |
| WO | 2005/030518 | 4/2005 |
| WO | 2007/010843 | 1/2007 |
| WO | 2007/116541 | 10/2007 |

OTHER PUBLICATIONS

International Search Report issued Jun. 14, 2011 in International (PCT) Application No. PCT/JP2011/055395.

Office Action issued May 27, 2014 in corresponding Japanese Application No. 2011-049187, with English translation.

Extended European Search Report issued Sep. 3, 2014 in corresponding European Application No. 11860264.8.

* cited by examiner

Fig. 6A
Fig. 6B
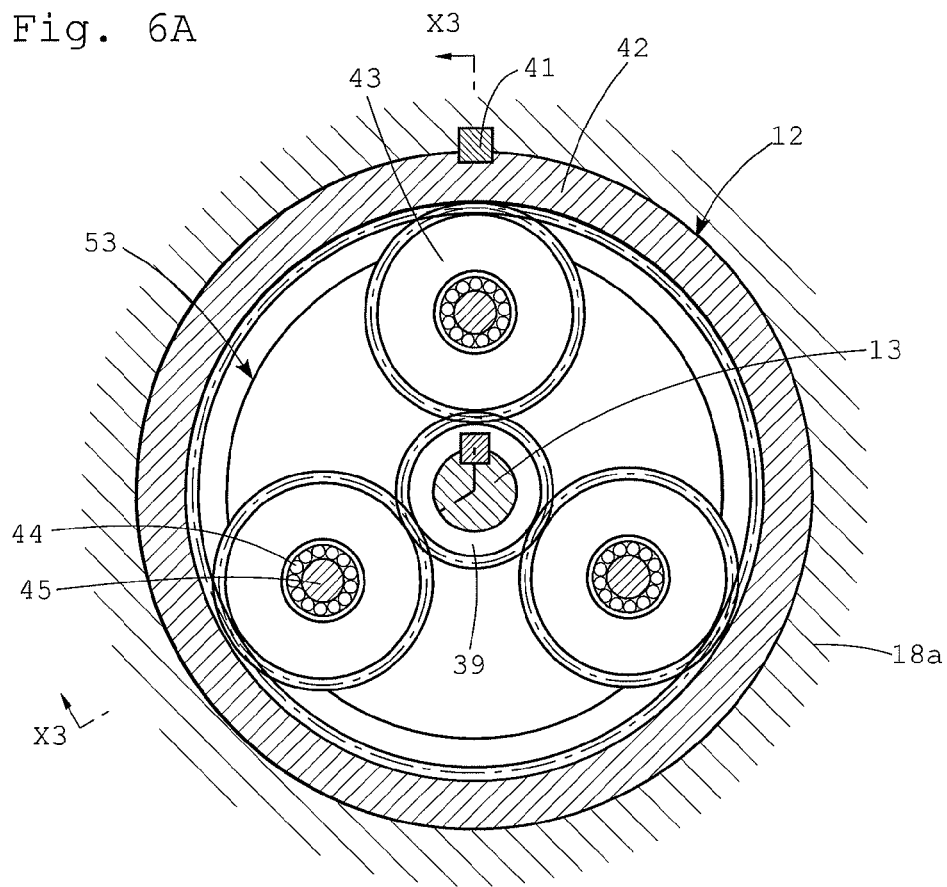
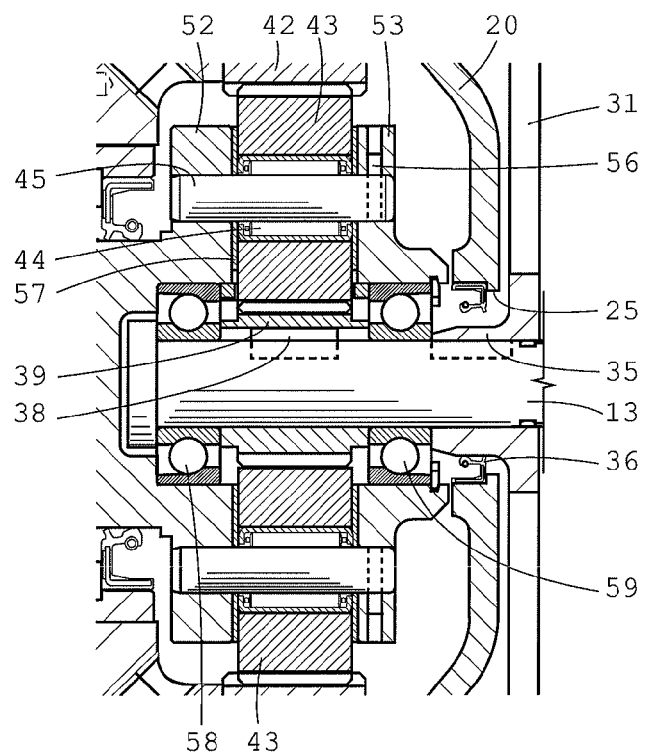

DRIVE DEVICE FOR ELECTRIC VEHICLE

TECHNICAL FIELD

The present invention relates to a drive device for an electric vehicle including an electric motor as a drive source, and particularly to a drive device for an electric vehicle of an in-wheel motor type.

A conventionally known drive device for an electric vehicle of an in-wheel motor type is made up of an electric motor, a speed reduction unit to which the output of the electric motor is inputted, and a hub unit which is rotated by the speed-reduced output of the speed reduction unit (Patent Literature 1).

In the drive device for an electric vehicle disclosed in Patent Literature 1, an electric motor is disposed outside the speed reduction unit in the radial direction, and the speed reduction unit in which planetary gear-type units are disposed in two stages in the axial direction is used. The reason why the speed reduction unit is disposed in two stages is for the purpose of increasing the speed reduction ratio.

A typical configuration of a speed reduction unit of planetary gear type is such that a sun gear is provided on an input shaft in a coaxial manner, and a ring gear is secured around the input shaft in a coaxial manner. A plurality of pinion gears are placed between the sun gear and the ring gear, and a pinion pin that supports each pinion gear is joined to a common carrier. The carrier is integrated with an output member.

The speed reduction unit is configured such that the pinion gear is caused to revolve while rotating on its axis by the rotation of the input shaft. The rotational speed of the revolving motion is reduced from the rotational speed of the input shaft, and a speed-reduced rotation is transferred to the output member via the carrier. The speed reduction ratio in this case will be $Zs/(Zs+Zr)$. Where, $Zs$ is the number of teeth of the sun gear, and $Zr$ is the number of teeth of the ring gear.

The input shaft of the speed reduction unit is supported by bearings disposed at two locations in the axial direction, that is, an inboard-side bearing and an outboard side bearing. The inboard-side bearing is attached to a housing of the speed reduction unit, and the outboard-side bearing is attached to the output member of the speed reduction unit. The housing is supported by the vehicle body via the suspension, and the output member is coupled and integrated with an inner member of the hub unit to rotationally drive the vehicle wheel.

In the above-described drive device for an electric vehicle, the load acting on the input shaft of the speed reduction unit is supported by the housing via the inboard-side bearing on the inboard side, and is supported by the output member of the speed reduction unit via the outboard-side bearing on the outboard side.

CITATION LIST

Patent Literature

Patent Literature 1: Japanese Patent Application Laid-Open No. 2001-32888

SUMMARY OF INVENTION

Attending to the support structure of the input shaft of the speed reduction unit, while vibration and impact in association with rotation of the wheel are transmitted to the end portion of outboard side of the input shaft via the output member and the outboard side bearing, vibration and impact of the wheel will not be directly transmitted to the end portion of inboard side since it is supported by a fixed housing via the inboard side bearing.

Moreover, since the hub and the hub bearing which support the output member of the speed reduction unit elastically deform due to the action of load applied to the wheel from the road surface, the outboard side bearing will be displaced with respect to the original shaft center of the input/output shaft. On the other hand, the housing which supports the inboard side bearing is not likely to be subjected to the effect of the load from the wheel so that coaxiality deterioration and/or misalignment occurs between the two bearings which support the input shaft.

For this reason, a problem exists in that eccentric load is likely to act on the inboard side bearing and the outboard side bearing, thereby causing deterioration of the rotational accuracy of the input shaft, deterioration of the durability of the bearings, and occurrence of rotational noise of the bearings.

Accordingly, it is an object of the present invention to achieve improvements in the rotational accuracy of the input shaft and the durability of the bearings, and suppression of rotational noise, by improving the support structure of the input shaft of the speed reduction unit.

To solve the above-described problems, the present invention provides a drive device for an electric vehicle, including: an electric motor; a speed reduction unit including an input shaft driven by output of the electric motor; and a hub unit rotationally driven by an output member of the speed reduction unit, wherein the input shaft of the speed reduction unit is supported by bearings provided at two locations in an axial direction, the drive device for an electric vehicle being configured such that the bearings at the two locations are attached together to the output member.

According to the above-described configuration, since the bearings for supporting the input shaft at two locations in the axial direction are attached together to the output member, vibration and impact transmitted from the vehicle wheel to the output member will be imposed on both the bearings at the same time and in the same manner. As a result of this, both the bearings are prevented from being subjected to eccentric load.

Moreover, it is possible to configure such that the pair of bearings are both disposed in the outboard side of a fitting portion between the input shaft and a rotor support member of the electric motor. In the case of conventional art, the inboard side bearing is attached to the housing of the speed reduction unit, and the outboard side bearing is attached to the output member of the speed reduction unit so that the input shaft has a so-called both-end support structure, resulting in a complicated support structure. In contrast to this, in the case of the present invention, the input shaft has a so-called cantilever support structure so that the support structure is simplified.

The output member may be configured to include flanges disposed on both sides in the axial direction of a speed reduction rotational member such as a pinion gear so that the flanges are coupled and integrated with each other by both end portions of a support pin of the speed reduction rotational member being secured to the flanges, and each of the above-described bearings is placed between the inner radial surface of each flange and the input shaft.

The above-described "speed reduction rotational member" and "support pin" correspond to the "pinion gear" and the "pinion pin" supporting the pinion gear respectively in the case of a planetary gear type. By attaching each bearing to the inner radial surface of each of the above-described flanges, it is possible to realize a configuration in which both bearings are attached together to the output member.

Since the above-described speed reduction unit has a configuration in which the flanges on both sides are coupled and integrated with each other by the support pins, the pinion gear can be placed between both the flanges.

Thus, the flanges can be configured to be coupled with each other by a bridge so that the flanges can be securely coupled and integrated with each other by the bridge.

Since both the flanges are securely engaged and integrated with each other by the above-described bridge, the support stiffness of the support pin such as the pinion pin, both end portions of which are coupled to both the flanges, is increased. Moreover, by providing the bridge at multiple locations of equally spaced positions in a circumferential direction of the flange, the rotation of the output member becomes smooth, and the rotational accuracy of the input shaft and the rotor of the electric motor fitted and secured to the input shaft is improved.

As so far described, since the present invention is configured such that the pair of bearings supporting the input shaft of the speed reduction unit are attached together to the output member of the speed reduction unit, it is possible to prevent eccentric load from acting on the bearings. As a result of that, the rotational accuracy of the input shaft and the durability of the bearings are improved, and further rotational noise of the bearings is suppressed.

BRIEF DESCRIPTION OF DRAWINGS

FIG. 6A is a cross sectional view of a variant of a speed reduction unit portion.

FIG. 6B is a cross sectional view taken along X3-X3 line of FIG. 6A.

DETAILED DESCRIPTION

Hereafter, embodiments of the present invention will be described based on the appended drawings.

Embodiment 1

Figure 1:
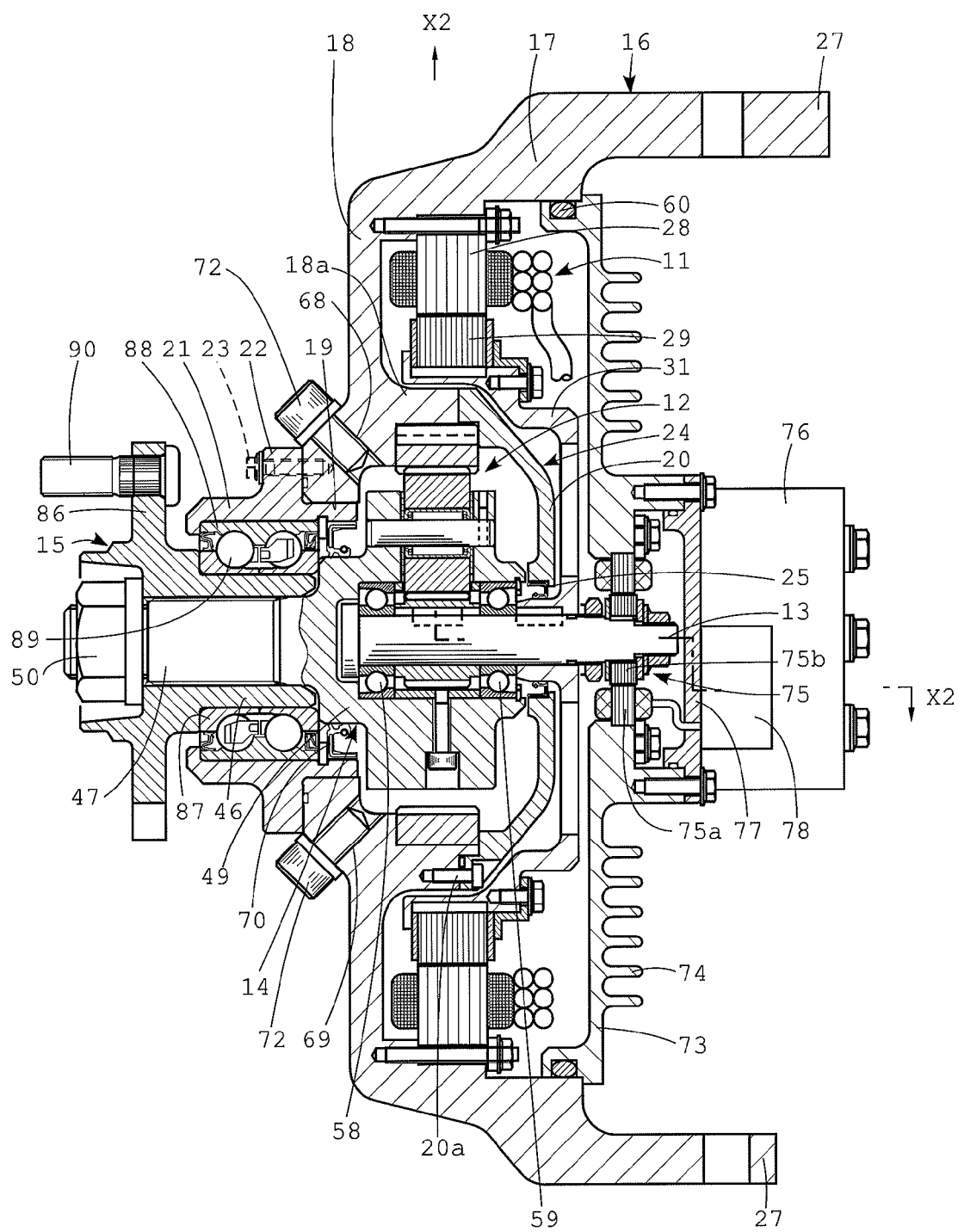
FIG. 1 is a cross sectional view of Embodiment 1.

A drive device for an electric vehicle relating Embodiment 1 includes, as principal components, an electric motor 11, a speed reduction unit 12 which is driven by the output power of the electric motor 11, a hub unit 15 which is rotated by an output member 14 coaxial with an input shaft 13 of the speed reduction unit 12, and a housing 16 which accommodates the electric motor 11 and the speed reduction unit 12, as shown in FIG. 1.

The above-described housing 16 includes a cylindrical portion 17 and a front end portion 18 in the radial direction, which is provided at the front end of the cylindrical portion 17 (the end portion of an outboard side, or an end portion on the left side of the figure). A central portion of the front end portion 18 is opened, and a rear end portion of an outer member 21 of the hub unit 15 is fitted into an opening portion 19 so that a flange 22 is secured to the front end portion 18 with a bolt 23.

A partition base portion 18a, which is concentric with the opening hole 19 and has a larger diameter than that, is provided inside the front end portion 18 of the housing 16. A dish-shaped partition member 20 is secured to the partition base portion 18a with a bolt 20a. A center hole 25 is provided at the center of the partition member 20. The center hole 25 faces an outer radial surface of the input shaft 13 with a gap in a radial direction therebetween. A partition 24 is formed of the above-described partition base portion 18a and the partition member 20 joined and secured thereto. The partition 24 has a function of sectioning the interior of the housing 16 into an accommodation space for the electric motor 11 on the outer radial side, and an accommodation space for the speed reduction unit 12 on the inner radial side.

A suspension joining portion 27 which projects in the axial direction is provided at two centrosymmetric locations on a rear end edge of the cylindrical portion 17 of the housing 16. In a conventional automobile, the hub unit 15 is joined to the suspension with a knuckle of the vehicle body lying therebetween; however, in the present Embodiment 1, the suspension on the vehicle body side can be directly joined to the suspension joining portion 27 which is a part of the housing 16.

Since the housing 16 will achieve the function of the knuckle, it can be described as a structure in which the knuckle is integrated with the housing 16. In this case, if the outer member 21 of the hub unit 15 becomes necessary to be replaced, the replacement can be performed simply by detaching the bolt 23 without need of detaching the housing 16 from the suspension.

In the case shown in the figure, the electric motor 11 is a radial-gap-type brushless DC motor, and is made up of a stator 28 secured to an inner radial surface of the cylindrical portion 17 of the housing 16, and a rotor 29 disposed on an inner radial surface of the stator 28 with a radial gap. The rotor 29 is fitted and secured to the input shaft 13 by a rotor support member 31.

The rotor support member 31 is made up of a support member cylindrical portion 31a (see FIG. 2) fitted to an inner radial portion of the rotor 29, and a support member disc portion 31b which extends reward along the partition 24 and which is bent to the inner radial direction of the partition. A boss portion 31c is provided in an inner radial portion of the support member disc portion 31b, and the boss portion 31c is fitted to the input shaft 13 and secured to the input shaft 13 with a key locking portion 35.

Figure 2:
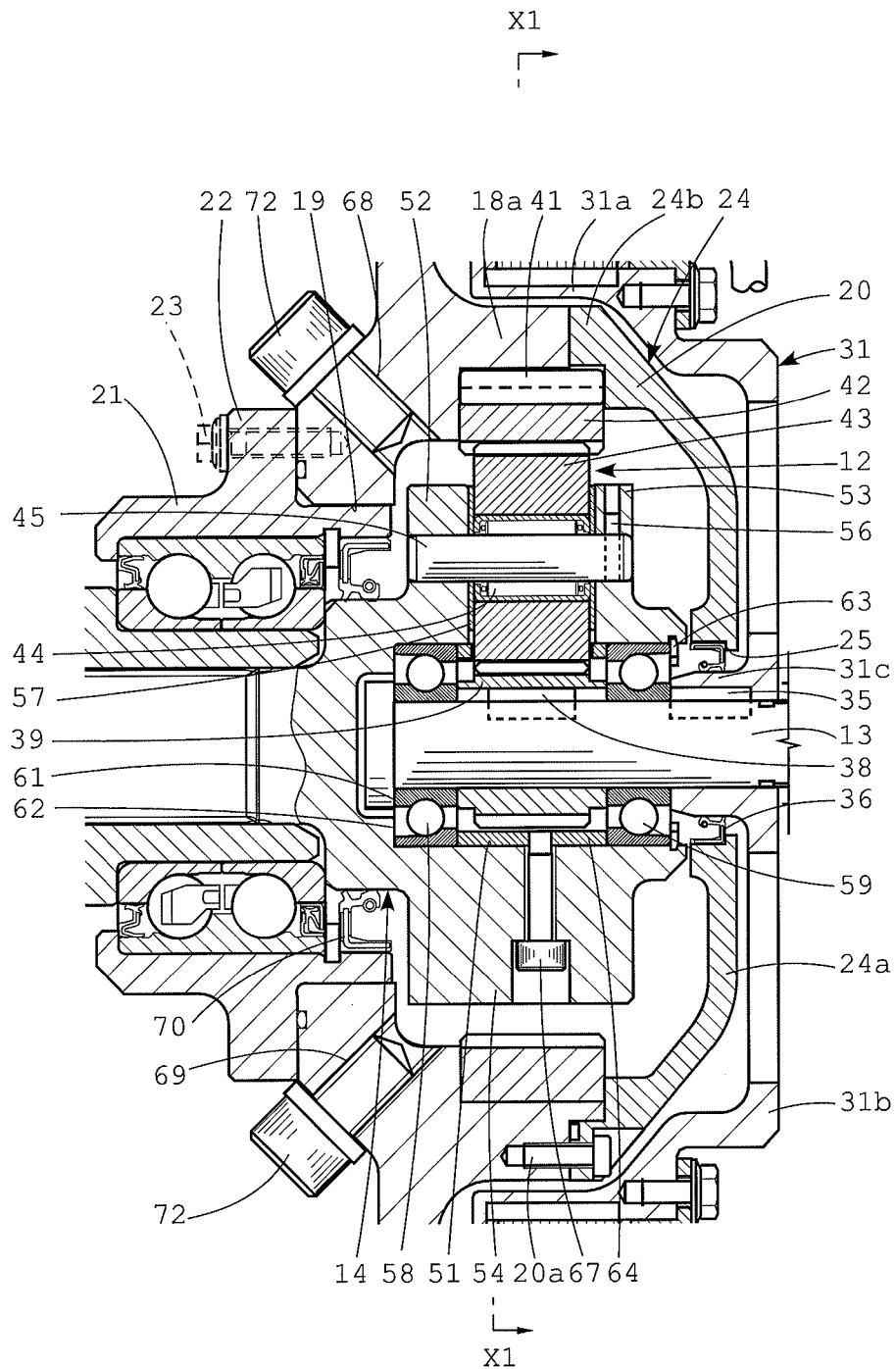
FIG. 2 is a partially enlarged cross sectional view of Embodiment 1.

The above-described boss portion 31c is inserted into the inner radial side of the center hole 25 of the partition 24, and an oil seal member 36 is placed between the center hole 25 and the boss portion 31c (see FIG. 2). The accommodation portion of the electric motor 11 and the accommodation portion of the speed reduction unit 12 are partitioned and oil-sealed by the partition 24 and the oil seal member 36. As a result of this, lubricant oil on the speed reduction unit 12 side is prevented from moving to the electric motor 11 side, and thus the electric motor 11 side is kept dry, thus resolving the malfunction that the lubricant oil hinders the rotation of the rotor 29.

The speed reduction unit 12 is of a planetary gear type, and is made up of, as shown in FIG. 2, the input shaft 13 and the output member 14, a sun gear 39 which is attached to the outer radial surface of the input shaft with a key locking portion 38, a ring gear 42 which is disposed along an inner radial surface of a boundary portion between the partition base portion 18a and the partition member 20 in the outer periphery of the sun gear 39, and which is attached with a key locking portion 41, and pinion gears 43 which are disposed at three locations equally spaced in the circumferential direction between the ring gear 42 and the sun gear 39. The pinion gear 43 is supported by a pinion pin 45 via a needle roller bearing 44.

The output member 14 includes a coupled shaft portion 47 at an end portion of an outboard side thereof. The coupled shaft portion 47 is spline-coupled to an inner member 46 of the hub unit 15 and secured by a nut 50. A bearing support portion 49, which is formed to have a one-step larger diameter than that of the coupled shaft portion 47, is provided on the inner end side of the coupled shaft portion 47.

On an inboard side of the output member 14, a pair of flanges 52 and 53 which oppose each other in the axial direction are provided with a spacing slightly larger than the width of the pinion gear 43 in the axial direction. A bridge 54 for joining the flanges 52 and 53 to each other in the axial direction is provided at three locations of equally spaced positions in the circumferential direction. The flanges 52 and 53 have a function as a carrier in the speed reduction unit 12 of planetary gear type.

Providing bridges 54 at equally spaced positions in the circumferential direction allows the output member 14 to be smoothly rotated, and moreover, to improve the rotational accuracy of the rotor 29 of the electric motor 11 through the output member 14 and the input shaft 13.

A shaft hole 51 which is coaxial with the coupled shaft portion 47 is provided at the center of an end surface of the flange 53 of the inboard side. This shaft hole 51 has a length reaching the bearing support hole 49.

Figure 3:
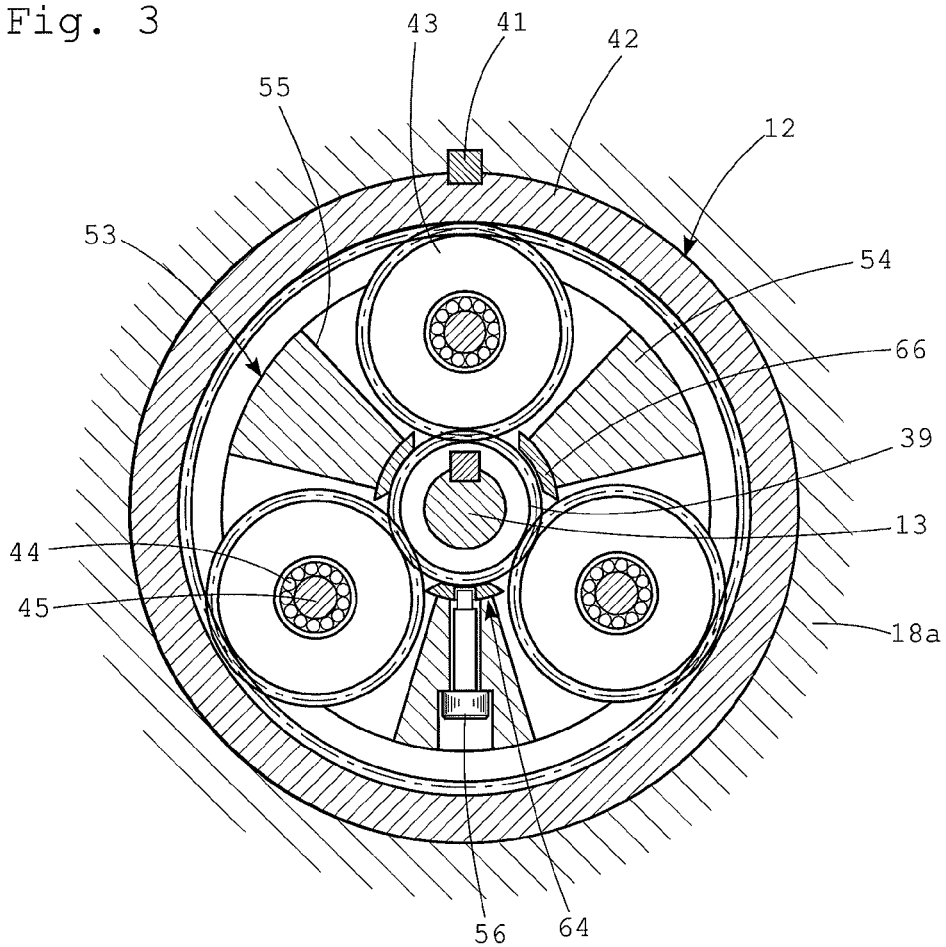
FIG. 3 is an enlarged sectional view taken along X1-X1 line in FIG. 2.

There are provided pinion gear accommodation portions 55 at the three locations, which are sectioned in the circumferential direction by the pair of the flanges 52 and 53 opposing each other in the axial direction, and the bridges 54 at the three locations in the circumferential direction (see FIG. 3). The pinion gear 43 is accommodated in each pinion gear accommodation portion 55, and both end portions of the pinion pin 45 are inserted through the flanges 52 and 53, respectively, and each secured by a locking screw 56. It can be said that both the flanges 52 and 53 are coupled and integrated with each other not only by the bridge 54, but also by the pinion pin 45.

Since the flanges 52 and 53 are integrated with each other by the bridge 54, the support stiffness at both ends of the pinion pin 45 increases.

A thrust plate 57 is placed between each side surface of each pinion gear 43 and each of the flanges 52 and 53 to ensure smooth rotation of the pinion gear 43.

A pair of rolling bearings 58 and 59 for supporting the input shaft 13 is provided on both sides of the sun gear 39 between an inner radial surface of each of the flanges 52 and 53 and the outer radial surface of the input shaft 13 opposing each of the inner radial surfaces of the flanges 52 and 53. By adopting this configuration, the respective rolling bearings 58 and 59 are supported together by the same output member 14.

Further, as shown in FIG. 2, the positional relationship in the axial direction between each of the rolling bearings 58 and 59, and a fitting portion between the support member disc portion 31b and the input shaft 13 is such that the respective rolling bearings 58 and 59 are disposed together on the outboard side, and form a so-called cantilever support structure as the support structure for the input shaft 13.

In contrast to this, in the conventional art (Patent Literature 1), while the bearing on the outboard side is disposed on the outboard side with respect to the fitting portion between the support member disc portion and the input shaft, the bearing on the inboard side is attached to the housing, and therefore is located on the inboard side with respect to the above-described fitting portion. Therefore, the support structure of the input shaft forms a so-called both-end support structure. The cantilever support structure is characterized by a simplified structure compared with the both-end support structure.

The above-described rolling bearing 58 on the outboard side is configured such that its inner ring is engaged with a stepped portion 61 provided in the input shaft 13, and its outer ring is engaged with a stepped portion 62 provided in an inner radial surface of the shaft hole 51. The rolling bearing 59 on the inboard side is configured such that its inner ring is engaged with the boss portion 31c of the rotor support member 31 and the key locking portion 35, and its outer ring is engaged with a retaining ring 63.

The sun gear 39 is placed between the respective inner rings of the respective rolling bearings 58 and 59, and also a spacer 64 is placed between the outer rings. The spacer 64 prevents both the rolling bearings 58 and 59 from being displaced in a direction to approach to each other.

Figure 4:
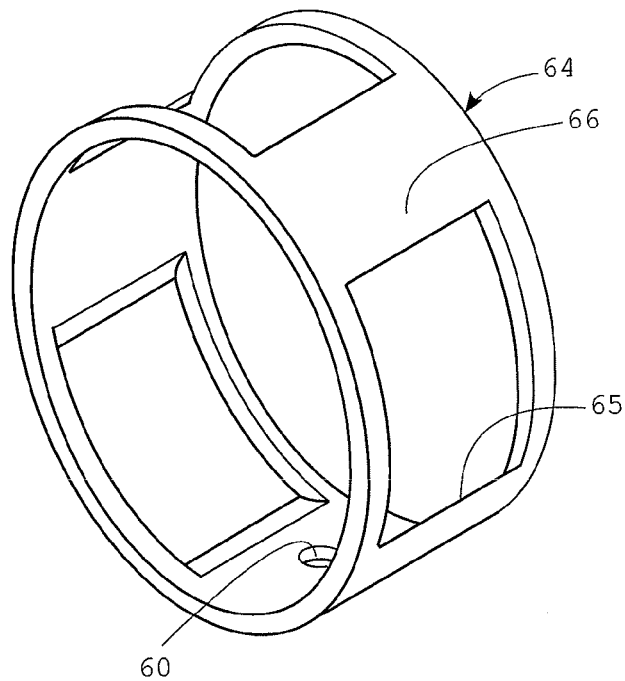
FIG. 4 is a perspective view of a spacer shown in FIG. 3.

The spacer 64 is formed into a cylindrical form as shown in FIGS. 3 and 4, and is provided, at three locations in the circumferential direction, with window holes 65 which correspond to the shape of the above-described pinion gear accommodation portion 55. Further, a closure portion 66 between the respective window holes 65 is formed into a shape corresponding to the shape of the bottom plane of the above-described bridge 54. The spacer 64 is placed between the rolling bearings 58 and 59 on the inner radial surface of the shaft hole 51 in a posture that each window hole 65 corresponds to the pinion gear accommodation portion 55 (see FIG. 3), and is configured to be positioned by screwing a fixing screw 67 from an outer radial surface of the bridge 54 into a positioning hole 60 (see FIG. 4).

The above-described spacer 64 allows to control the bearing pressurization to be applied to both the rolling bearings 58 and 59 by appropriately setting the axial length thereof, thus providing a simple fixed-position pressurization structure.

When seen in the radial direction, the speed reduction unit 12 is radially disposed to be accommodated on the inner radial side of the electric motor 11 with respect to the partition 24, and the size in the axial direction is made compact compared with a case where the unit is disposed in the axial direction.

Here, additionally describing the partition 24, the partition cylindrical portion 24b is placed between the electric motor 11 and the speed reduction unit 12, which are disposed in the radial direction, and the partition disc portion 24a is placed between the speed reduction unit 12 and the support member disc portion 31b. A peripheral edge portion of the center hole 25 faces the outer radial surface of the boss portion 31c of the rotor support member 31 with a predetermined spacing therebetween. The ring gear 42 of the speed reduction unit 12 is secured to an inner radial surface of the partition base portion 18a with the key locking portion 41.

The oil seal member 36 is placed between the peripheral edge portion of the above-described center hole 25 and the boss portion 31c. The accommodation space for the electric motor 11 of the housing 16 and the accommodation space for the speed reduction unit 12 are partitioned by the presence of the oil seal member 36 and the partition 24. Since, as a result of this, the lubricant oil on the speed reduction unit 12 side is prevented from moving to the electric motor 11 side, and thus the electric motor side is kept dry, the lubricant oil is prevented from hindering the rotation of the rotor 29.

Although, it is described above that both the flanges 52 and 53 of the output member 14 are coupled and integrated by both the bridge 53 and the pinion pin 45, it is possible to take a structure in which the flange 53 is configured to be a separate body from the output member 14 and both are coupled and integrated by the pinion pin 45, as shown in FIGS. 6A and 6B.

An oil filler port 68 and an oil drainage port 69 for lubricant oil to lubricate the interior of the speed reduction unit 12 are provided in the front end portion 18 of the housing 16. The lubricant oil is sealed by the above-described oil seal member 36 on the electric motor 11 side, and is sealed by an oil seal member 70, which is placed between the bearing support portion 49 of the output member 14 and the outer member 21, on the hub unit 15 side. The oil filler port 68 and the oil drainage port 69 are blocked by a blocking screw 72.

Since the electric motor 11 and the speed reduction unit 12, excepting the rear end portion (the end portion of the inboard side) of the input shaft 13, fit in the range of the axial length of the cylindrical portion 17 of the housing 16 as shown in FIG. 1, a rear cover 73 is fitted to the rear end portion of the cylindrical portion 17 via a seal member 60. A fin 74 for heat dissipation is provided on an outer side surface of the rear cover 73 so that heat of the electric motor 11 is dissipated to the outside.

A rotation angle sensor 75 is provided between the center hole of the rear cover 73 and the input shaft 13 that passes through the center hole, and that portion is covered by a sensor cover 77. The rotation angle sensor 75 shown is a resolver, and whose sensor stator 75a is secured into the center hole of the rear cover 73, and the sensor rotor 75b is attached to the input shaft 13.

A lead wire 79 of the sensor stator 75a is connected to a connector insertion portion 78 provided outside the sensor cover 77. As the rotation angle sensor 75, a Hall element can be used besides the above-described resolver. A connector (not shown) of a signal wire cable is inserted into the connector insertion portion 78.

A rotational angle of the input shaft 13 detected by the rotation angle sensor 75 is inputted to a control circuit, which is omitted from showing, via the above-described signal wire cable to be used for the rotational control of the electric motor 11.

Figure 5:
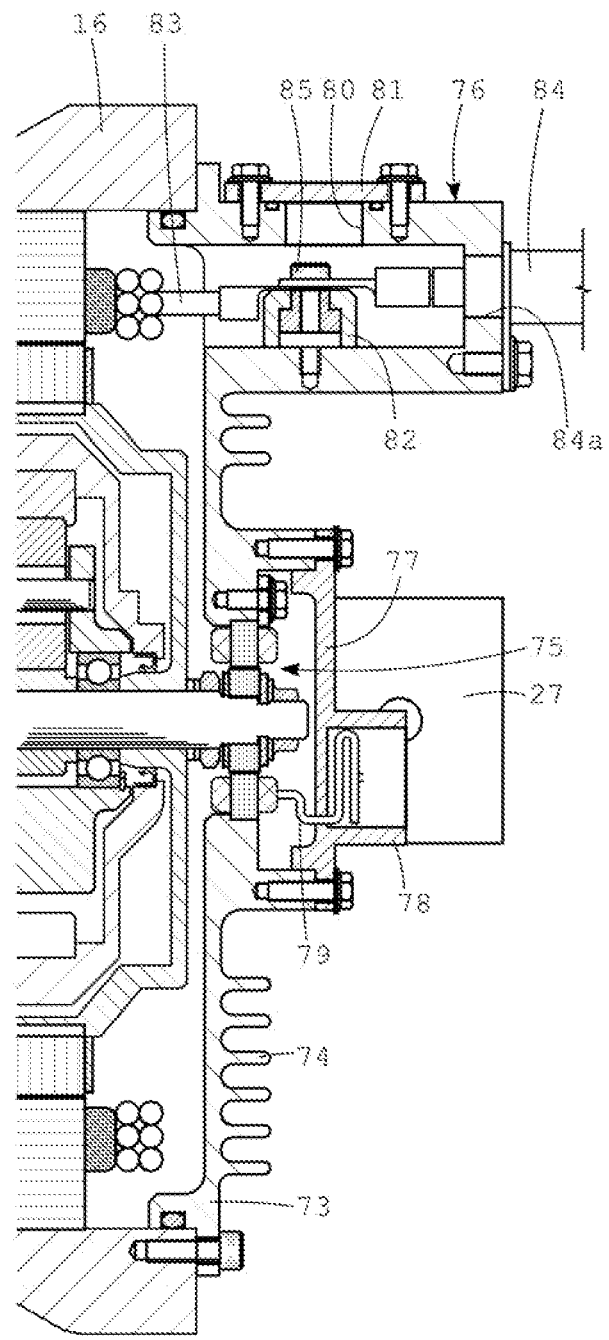
FIG. 5 is a cross sectional view taken along X2-X2 line in FIG. 1.

A power supply terminal box 76 for providing power supply to the stator 28 of the electric motor 11 is provided at a position decentered toward an outer peripheral edge of the above-described rear cover 73, and at a position 90 degrees different from the above-described suspension joining portion 27 (see FIG. 5).

The power supply terminal box 76 is formed into a cylindrical shape that passes through the rear cover 73, and is provided with a working hole 80 in an outer peripheral portion of the box. The working hole 80 is usually blocked by a cover 81. A power supply terminal 82 is provided inside the box at a position opposing the working hole 80. A lead wire 83 connected to the winding of the stator 28 is connected to the power supply terminal 82, and also a connection terminal of a power supply cable 84 is connected to the same power supply terminal 82. These are secured by a fastening screw 85. A cable hole 84a is provided at a rear end of the power supply terminal box 76 and the power supply cable 84 is inserted therethrough.

The hub unit 15 is made up of, as shown in FIG. 1, the above-described inner member 46 which is integrated with a hub 86, a pair of inner rings 87 that are fitted to an outer radial surface of the inner member 46, the outer member 21 having the flange 22, an outer ring 88 fitted to an inner radial surface of the outer member 21 and having multiple rows of tracks, and multiple rows of balls 89 to be placed between the inner ring 87 and the outer ring 88. The vehicle wheel is attached to the hub 86 with hub bolts 90.

The coupled shaft portion 47 of the output member 14 is spline-coupled to an inner radial surface of the inner member 46, and a tip end portion of the coupled shaft portion 47 projecting to the outside from the inner member 46 is secured by the nut 50 as described above. In place of the securing means using the nut 50, securing means such as press cut joint, diameter expansion caulking, and swing caulking may be adopted.

Although the above-described hub unit 15 is of a form of so-called first generation, those of a form of the second generation or third generation may be used.

The driving device for an electric vehicle of Embodiment 1 is configured as described above, and next, the operation thereof will be described.

When the electric motor 11 is driven by an accelerator at the driving seat being activated, the input shaft 13 is rotated integrally with the rotation of the rotor 29, and a motor output is inputted to the speed reduction unit 12. In the speed reduction unit 12, when the sun gear 39 rotates integrally with the input shaft 13, the pinion gears 43 revolve around the sun gear 39 while rotating on their own axes. Each of the pinion pins 45 performs speed-reduced rotation at the revolving speed, and thereby rotates the output member 14 at a speed-reduced output shown by the above-described speed reduction ratio.

The inner member 46 of the hub unit 15 is rotated integrally with the coupled shaft portion 47 of the output member 14, thereby driving the wheel attached to the hub 86.

The above-described input shaft 13 rotates by being supported respectively by the rolling bearing 58 on the outboard side and the rolling bearing 59 on the inboard side at both sides of the pinion gear 43. Since these rolling bearings 58 and 59 are both attached to the respective flanges 52 and 53 (respective flanges 52 and 53 which are integrated via the pinion pin 45 in the case of FIGS. 6A and 6B) which are each integrated with the output member 14, vibration and impact in the radial direction which are transmitted from the wheel to the output member 14 through the hub unit 15 is imposed onto both the rolling bearings 58 and 59 at the same time and in the same manner.

Since, as a result of that, both the rolling bearings 58 and 59 can be prevented from being subjected to eccentric load, it is possible to improve the rotational accuracy and durability, and suppress the rotation noise.

Since the pinion pin 45 of the pinion gear 43 is supported at both end portions thereof by the respective flanges 52 and 53, the support stiffness increases compared with a conventional case where it is cantilevered.

The above-described rolling bearings 58 and 59 are disposed on the outboard side with respect to the fitting portion between the support member 31 of the rotor 29 and the input shaft 13, that is, the key locking portion 35, so that the support structure becomes simple and easy to be assembled compared with a conventional case where the bearings are disposed on both sides thereof.

Further, since the lubricant oil in the speed reduction unit 12 is sealed on the electric motor 11 side by the oil seal member 36, and sealed on the hub unit 15 side by the oil seal member 70, leakage on the electric motor 11 side and the hub unit side is prevented. As a result of that, on the electric motor 11 side, rotation of the rotor 29 is not hindered, and on the hub unit 15 side, leakage of the lubricant oil to the outside through the hub unit 15 is prevented.

The heat generated in association with the driving of the electric motor 11 is effectively dissipated by the fin 74 of the rear cover 73.

The rotational angle of the input shaft 13, which is necessary for the rotational control of the electric motor 11, is detected by the rotation angle sensor 75 and inputted to the control apparatus.

Embodiment 2

Figure 7:
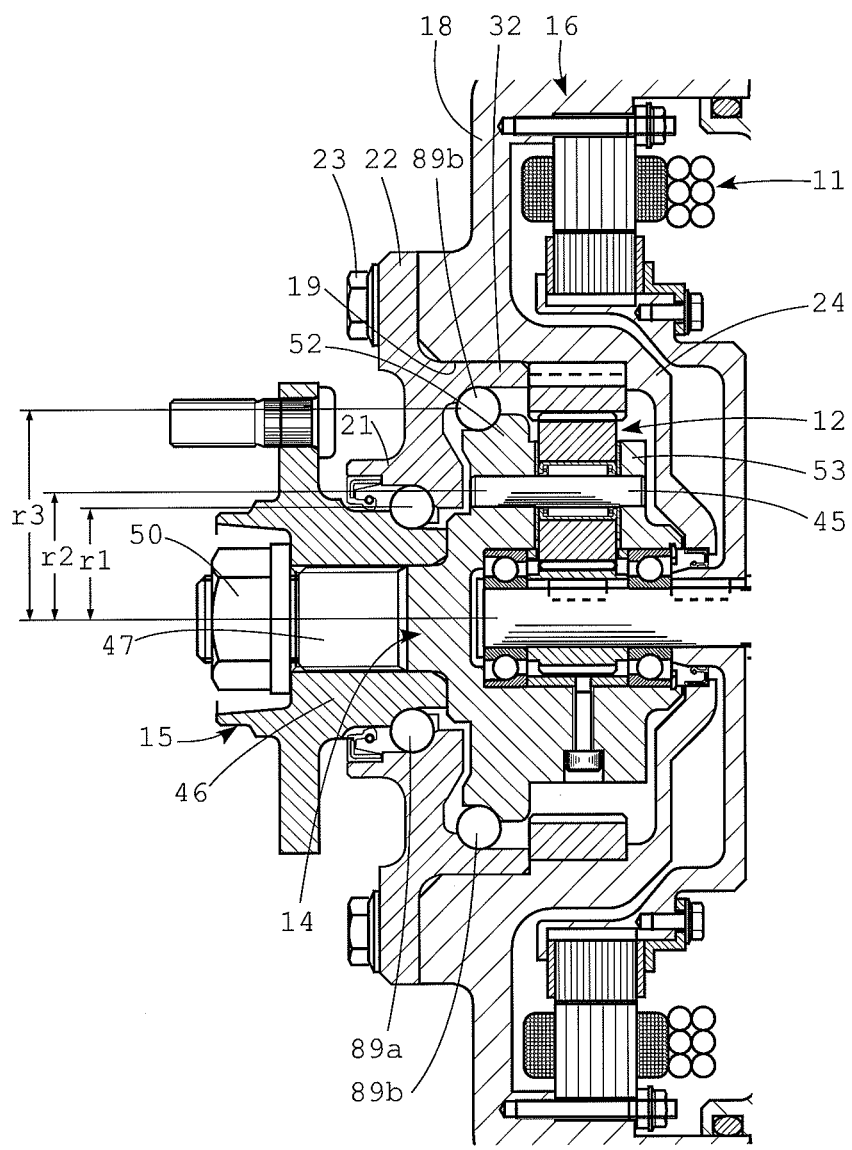
FIG. 7 is a cross sectional view to show a part of Embodiment 2.

Embodiment 2 shown in FIG. 7 differs in the configuration of the hub unit 15 compared with the above-described Embodiment 1. That is, the flange 22 of the outer member 21 of the hub unit 15 in this case is formed to have a larger diameter than that of the flange 22 (see FIG. 1) of the above-described Embodiment 1.

A flange cylindrical portion 32 projecting in the axial direction is provided in the inner side surface of the flange 22 with a larger diameter. The flange cylindrical portion 32 extends over an outer radial surface of the flange 52 on the outboard side of the output member 14. The flange cylindrical portion 32 is fitted to an inner radial surface of the opening hole 19 of the front end portion 18 of the housing 16.

Since, compared with the case of Embodiment 1, the opening hole 19 is formed to have a large inner diameter, it is easy to fabricate the partition 24 which is integrated with the front end portion 18, in the case of this Embodiment 2. For this reason, in the case of Embodiment 2, the partition member 20 (see FIG. 1) which is a separate member is not used.

A ball of a hub bearing 89a on the outboard side is placed between a track groove formed in the outer radial surface of the inner member 46, and a track groove formed in the inner radial surface of the outer member 21. Moreover, the ball of the hub bearing 89b on the inboard side is placed between a track surface formed in the outer radial surface of the flange 52 and a track groove formed in an inner radial surface of the flange cylindrical portion 32.

Letting the radii, from the center of the output member, of the ball center of the hub bearing 89a on the outboard side, the center of the pinion shaft 45, and the ball center of the hub bearing 89b on the inboard side be r1, r2, and r3, respectively, these sizes have a relationship as r1<r3, and r2<r3. Other configurations are the same as those of the case of Embodiment 1.

As describe above, setting the ball PCD (pitch circle diameter) of the hub bearing 89b on the inboard side to be larger than the ball PCD of the hub bearing 89a on the outboard side results in increasing in the bearing stiffness of the hub unit 15.

It is noted that the hub unit 15 in this case can be said to be a variant form of the so-called third generation.

Although, in the illustrated case, each of the balls of the hub bearings 89a and 89b is configured to be in contact with the directly formed track groove, it is also possible to configure such that a bearing in which the track groove is provided in each of its inner ring and outer ring is used, and these track rings are fitted to the aforementioned opposite members.

Embodiment 3

Figure 8:
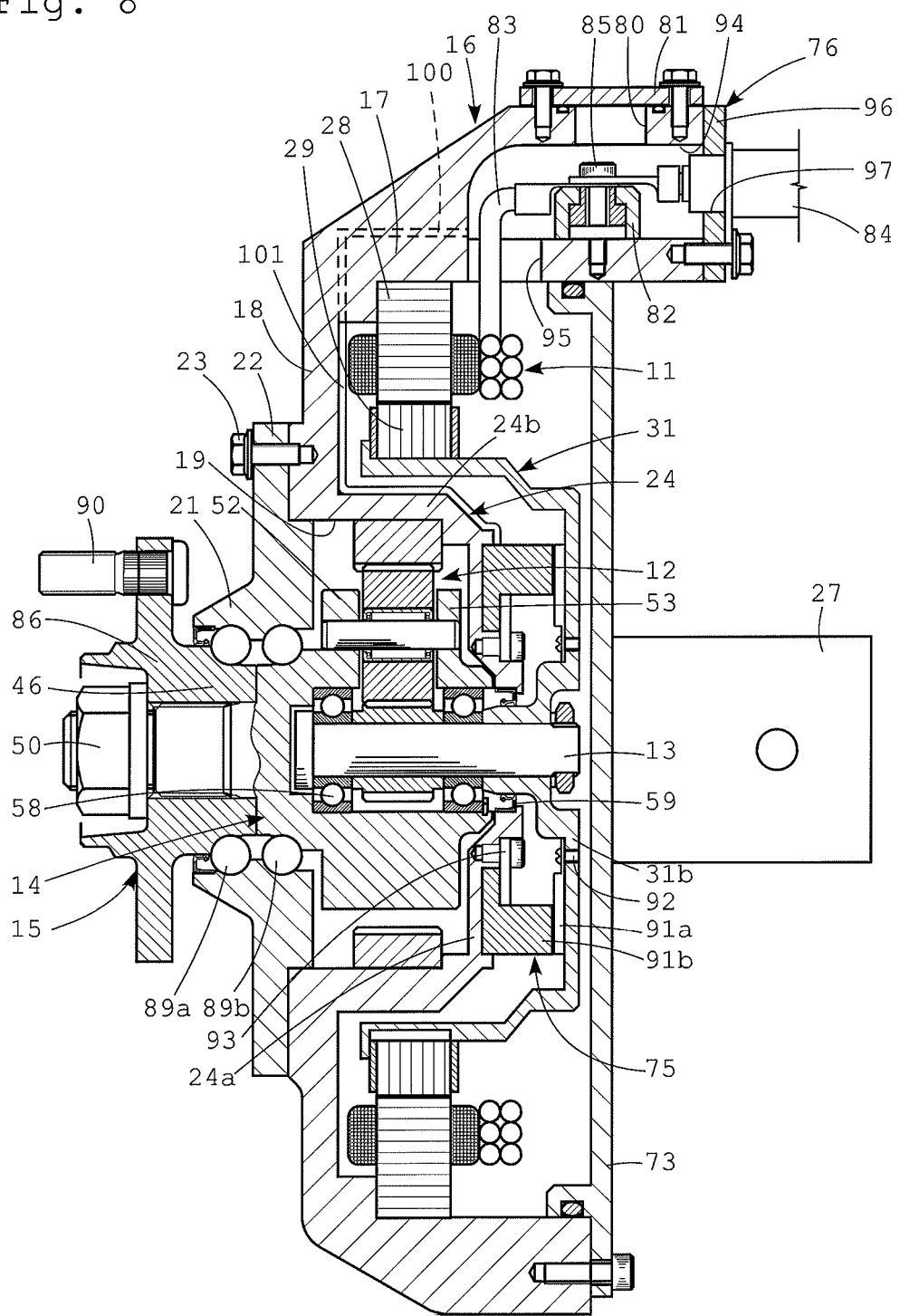
FIG. 8 is a cross sectional view of Embodiment 3.
Figure 9:
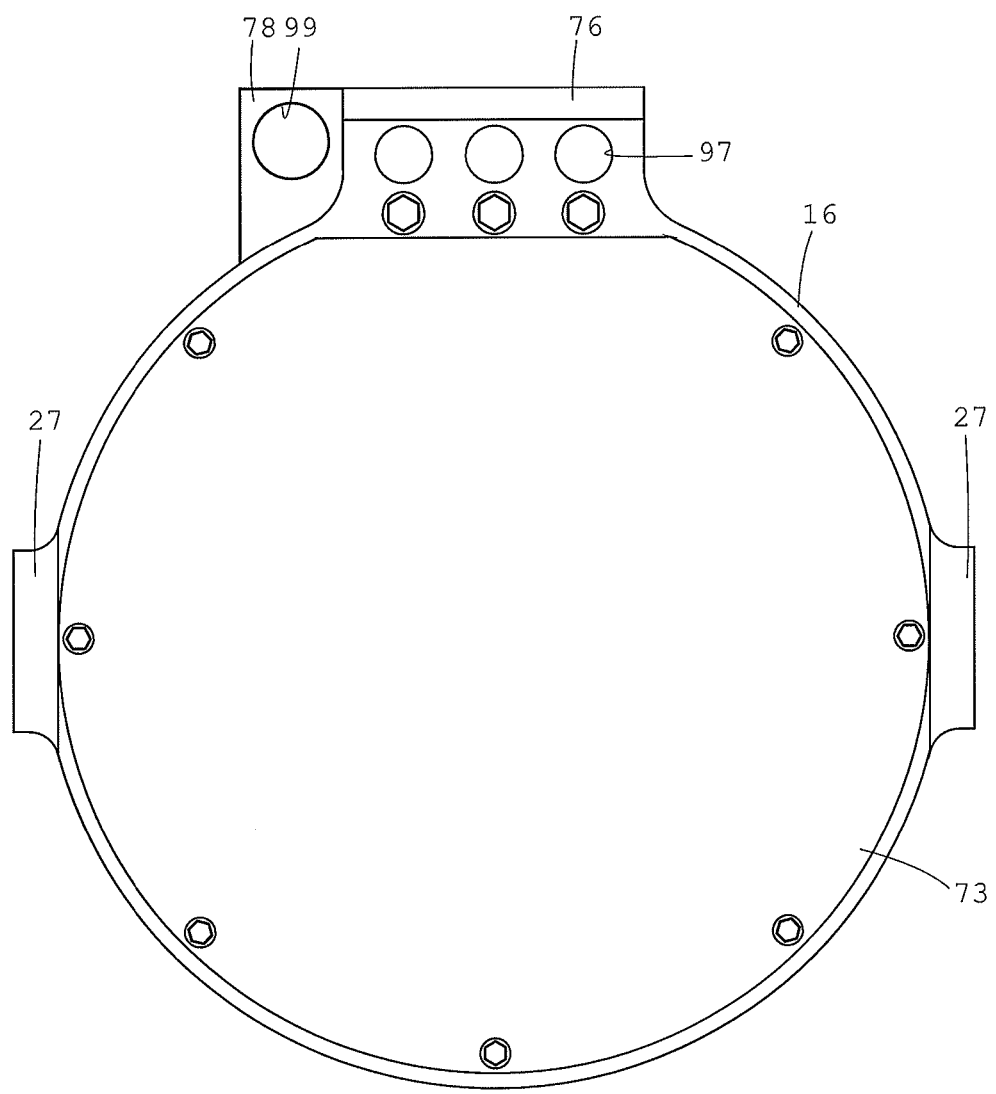
FIG. 9 is a side view of Embodiment 3.
Figure 10:
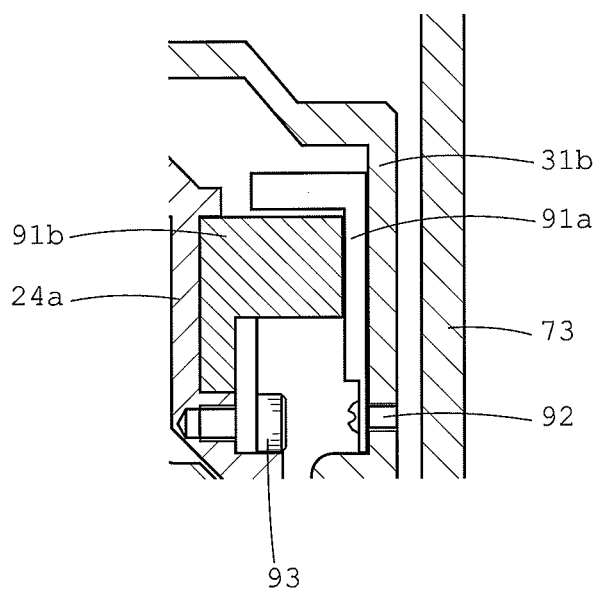
FIG. 10 is a partial cross sectional view of a variant of Embodiment 3.

Embodiment 3 shown in FIGS. 8 to 10 differs from Embodiment 1 in the configurations of the hub unit 15, the rotation angle sensor 75, the power supply terminal box 76, and the connector insertion portion 78.

That is, the hub unit 15 in this case is formed such that the flange 22 of the outer member 21 has a larger diameter than in the case of Embodiment 1. Since, for this reason, the opening hole 19 of the front end portion 18 of the housing 16 is formed to have a larger inner diameter as in the case of Embodiment 2, it is possible to form the partition 24 integrally with the front end portion 18.

The ball 89a on the outboard side constituting the hub bearing is placed between the track groove provided in the outer radial surface of the inner member 46 and the track groove provided in the inner radial surface of the outer member 21. Further, the ball 89b on the inboard side is placed between the track grove provided in the outer radial surface of the output member 14 and the track groove provided in the inner radial surface of the outer member 21. It can be said to be a variant type of the so-called third-generation.

The rotation angle sensor 75 is provided between opposite surfaces in the axial direction of the support member disc portion 31b of the rotor support member 31, and the partition disc portion 24a constituting the partition 24. A sensor rotor 91a is made up of a magnet which is attached to the support member disc portion 31b with a screw 92. Moreover, a sensor stator 91b is made up of a Hall element attached to the opposite surface of the partition disc portion 24a with a screw 93. Both oppose each other via an axial gap.

As shown in FIG. 10, the cross sectional shape of the sensor rotor 91b may be formed into a reverse L-shape, and a radial gap may be formed between the horizontal portion of the sensor rotor and the sensor stator 91a.

The power supply terminal box 76 and the connector insertion portion 78 are both provided in the housing 16 (see FIG. 9). The power supply terminal box 76 is configured such that an accommodation recessed portion 94 is provided within the range of the wall thickness of a rear end surface of the housing 16, and the power supply terminal 82 is provided inside the accommodation recessed portion 94. A communication hole 95 in communication with the interior of the housing 16 is provided in a deep part of the accommodation recessed portion 94. The opening surface of the accommodation recessed portion 94 is blocked by a cover member 96. The cover member 96 is provided with a cable hole 97 for passing the power supply cable 84.

Further, the working hole 80 is provided in the wall surface of the housing 16. This working hole 80 is usually blocked by the cover 81. The lead wire 83 on the electric motor 11 side is connected to the power supply terminal 82 through the communication hole 95, and the power supply cable 84 is drawn in through the cable hole 97 so that its connection terminal is connected to the power supply terminal 82. Both are coupled to the power supply terminal 82 with a fastening screw 85.

The connector insertion portion 78 is provided in the rear end surface of the housing 16 side-by-side with the power supply terminal box 76, as shown in FIG. 9. The connector insertion portion 78 is configured such that a recessed portion 99 is provided in the rear end surface of the housing 16, and a lead wire hole 100 which brings a deep part of the recessed portion 99 and the interior of the housing 16 into communication is provided (see FIG. 8). A lead wire 101 of the rotation angle sensor 84 is connected to the interior of the recessed portion 99 through the lead wire hole 100. The connector (not shown) of the signal cable is inserted into the connector insertion portion 78.

As described above, the configuration in which both the power supply terminal box 76 and the connector insertion portion 78 are provided in the housing 16 can simplify the configuration of the rear cover 73 so that it can be made up of a thin metal plate, a plastic plate, and the like.

REFERENCE SIGNS LIST

11 Electric motor
12 Speed reduction unit

13 Input shaft
14 Output member
15 Hub unit
16 Housing
17 Cylindrical portion
18 Front end portion
18a Partition base portion
19 Opening hole
20 Partition member
20a Bolt
21 Outer member
22 Flange
23 Bolt
24 Partition
24a Partition disc portion
24b Partition cylindrical portion
25 Center hole
27 Suspension joining portion
28 Stator
29 Rotor
31 Rotor support member
31a Support member cylindrical portion
31b Support member disc portion
31c Boss portion
32 Flange cylindrical portion
35 Key locking portion
36 Oil seal member
38 Key locking portion
39 Sun gear
41 Key locking portion
42 Ring gear
43 Pinion gear
44 Needle roller bearing
45 Pinion pin
46 Inner member
47 Coupled shaft portion
49 Bearing support portion
50 Nut
51 Shaft hole
52, 53 Flange
54 Bridge
55 Pinion gear accommodation portion
56 Locking screw
57 Thrust plate
58, 59 Rolling bearing
60 Positioning hole
61, 62 Stepped portion
63 Retaining ring
64 Spacer
65 Window hole
66 Closure portion
67 Fixing screw
68 Oil filler port
69 Oil drainage port
70 Oil seal member
71 Groove
72 Blocking screw
73 Rear cover
74 Fin
75 Rotation angle sensor
75a Sensor stator
75b Sensor rotor
76 Power supply terminal box
76a Power supply terminal
77 Sensor cover
78 Connector insertion portion
79 Lead wire of the sensor stator
80 Working hole
81 Cover
82 Power supply terminal
83 Lead wire
84 Power supply cable
84a Cable hole
85 Fastening screw
86 Hub
87 Inner ring
88 Outer ring
89 Ball
89a, 89b Hub bearing
90 Hub bolt
91a Sensor rotor
91b Sensor stator
92, 93 Screw
94 Accommodation recessed portion
95 Communication hole
96 Cover member
97 Cable hole
99 Recessed portion
100 Lead wire hole
101 Lead wire of the rotation angle sensor

The invention claimed is:

1. A drive device for an electric vehicle, comprising: an electric motor; a speed reduction unit including an input shaft driven by output of the electric motor; and a hub unit rotationally driven by an output member which is coaxial with the input shaft of the speed reduction unit, wherein the input shaft of the speed reduction unit is supported by a pair of bearings at both sides in an axial direction of the speed reduction unit,
the drive device for the electric vehicle being configured such that the pair of bearings are supported together by the output member,
wherein the output member has a pair of flanges which are disposed on both sides in an axial direction of a speed reduction rotational member of the speed reduction unit, the flanges are coupled and integrated with each other by both end portions of a support pin of the speed reduction rotational member being secured to each flange, and each of the bearings is placed between an inner radial surface of each flange and the input shaft.

2. The drive device for an electric vehicle according to claim 1, wherein the speed reduction unit is of a planetary gear type comprising a sun gear and a ring gear, which are provided coaxially with the input shaft,
the speed reduction rotational member comprises a plurality of pinion gears which are provided at equally spaced positions in a circumferential direction between the sun gear and the ring gear, and
the speed reduction unit comprises a carrier for holding the pinion gears.

3. The drive device for an electric vehicle according to claim 2, wherein
the carrier comprises the flanges, the flanges are integrated with each other by bridges provided at a required spacing in a circumferential direction, and the pinion gears are accommodated between the respective bridges, and
the speed reduction unit comprises, as the support pin, a plurality of pinion pins for the pinion gears, respectively, and both end portions of the pinion pins are supported by the flanges, respectively.

4. A drive device for an electric vehicle, comprising: an electric motor; a speed reduction unit including an input shaft driven by output of the electric motor; and a hub unit rotationally driven by an output member which is coaxial with the input shaft of the speed reduction unit, wherein the input shaft of the speed reduction unit is supported by a pair of bearings at both sides in an axial direction of the speed reduction unit,
the drive device for the electric vehicle being configured such that the pair of bearings are supported together by the output member,
wherein the pair of bearings are each made up of a rolling bearing; a ring-shaped spacer is placed between outer rings of the pair of rolling bearings; the spacer is provided with a window hole in a portion which opposes a speed reduction rotational member of the speed reduction unit, where the window hole is for the purpose of avoiding interference; and a fixing screw of the spacer is screwed from an outer radial surface of a bridge.

* * * * *